(12) United States Patent
Vecchione

(10) Patent No.: US 9,797,420 B2
(45) Date of Patent: Oct. 24, 2017

(54) ELONGATE ATTACHABLE FLEXIBLE MAGNETIC ARTICLE HOLDER

(71) Applicant: Raul Ricardo Vecchione, O'Fallon, MO (US)

(72) Inventor: Raul Ricardo Vecchione, O'Fallon, MO (US)

(73) Assignee: Cloop, LLC, Buffalo, WY (US)

( * ) Notice: Subject to any disclaimer, the term of this patent is extended or adjusted under 35 U.S.C. 154(b) by 114 days.

(21) Appl. No.: 14/611,254

(22) Filed: Feb. 1, 2015

(65) Prior Publication Data

US 2015/0223573 A1 Aug. 13, 2015

Related U.S. Application Data

(60) Provisional application No. 61/937,958, filed on Feb. 10, 2014.

(51) Int. Cl.
*A44B 99/00* (2010.01)
*F16B 1/00* (2006.01)
(Continued)

(52) U.S. Cl.
CPC ............... *F16B 1/00* (2013.01); *A44B 99/00* (2013.01); *B65D 63/109* (2013.01);
(Continued)

(58) Field of Classification Search
CPC .... A44B 99/00; B65H 75/446; B65H 75/366; B65H 2701/3919; Y10T 24/44231; Y10T 24/32; Y10T 24/14; Y10T 24/1498
See application file for complete search history.

(56) References Cited

U.S. PATENT DOCUMENTS 2,961,785 A * 11/1960 Toepfer ..................... G09F 3/04
24/16 PB
3,094,807 A * 6/1963 Dorman ................. A63H 27/10
24/543
(Continued)

FOREIGN PATENT DOCUMENTS

WO WO 2013121169 A2 * 8/2013 ............ F16L 3/1236
WO WO2013121169 A3 8/2013

OTHER PUBLICATIONS

Product Title: Loop Possible Disclosue Date: Aug. 16, 2013 Website: https://www.kickstart.com/projects/452689227/loop-organized-cables/description See attached non-patent literature for photograph.
(Continued)

*Primary Examiner* — Robert J Sandy
*Assistant Examiner* — Louis Mercado
(74) *Attorney, Agent, or Firm* — Eric Kelly

(57) ABSTRACT

An elongate article holder with a flexible non-magnetic band, along with two terminal ends that may be removably secured to each other, is used to wrap around an elongate article or coils of the elongate article. In various exemplary embodiments, removable coupling of the two terminal ends may be provided by magnet(s), which may be substantially protected from environmental harm while simultaneously helping to achieve optimum magnetic closure strength by using tubular apertures/dimples which may run from a cavity housing the magnet to or near a mating surface of a respective terminal end. Further, the flexible non-magnetic band may have an integral closed loop for removably attaching to the elongate article, operating by passing a portion of the elongate article through a formed orifice that is formed from the integral closed loop.

20 Claims, 9 Drawing Sheets

(51) Int. Cl.
  *B65H 75/36* (2006.01)
  *B65H 75/44* (2006.01)
  *B65D 63/10* (2006.01)

(52) U.S. Cl.
  CPC ....... *B65D 63/1018* (2013.01); *B65H 75/366* (2013.01); *B65H 75/446* (2013.01); *B65H 2701/3919* (2013.01); *F16B 2001/0035* (2013.01); *Y10T 24/14* (2015.01); *Y10T 24/1498* (2015.01); *Y10T 24/32* (2015.01); *Y10T 24/44231* (2015.01)

(56) References Cited

U.S. PATENT DOCUMENTS

| | | | |
|---|---|---|---|
| 3,102,314 A | 9/1963 | Alderfer | |
| 3,111,734 A * | 11/1963 | Pachner | A01K 65/00 224/103 |
| 3,529,328 A | 9/1970 | Davison | |
| 4,193,174 A * | 3/1980 | Stephens | A44B 99/00 128/207.18 |
| 4,447,238 A * | 5/1984 | Eldridge, Jr. | A61M 25/02 128/DIG. 26 |
| 4,466,159 A * | 8/1984 | Burrage | B65D 63/10 24/16 PB |
| 4,490,887 A | 1/1985 | Sarton | |
| 5,005,790 A * | 4/1991 | Harris, III | B65H 75/366 248/213 |
| D321,062 S | 10/1991 | Bonbright | |
| 5,429,289 A * | 7/1995 | Lamson | A47L 13/512 119/769 |
| 5,432,986 A | 7/1995 | Sexton | |
| 5,682,653 A | 11/1997 | Berglof | |
| 5,745,958 A * | 5/1998 | Kaldor | A44B 18/00 24/16 PB |
| 6,622,349 B2 | 9/2003 | Wong | |
| 6,656,199 B1 | 12/2003 | Lafontaine | |
| 6,833,507 B2 | 12/2004 | Arkin | |
| 6,899,423 B1 | 5/2005 | Brazell | |
| 6,925,656 B2 | 8/2005 | Henderson | |
| 7,187,261 B2 | 3/2007 | Cassar | |
| 8,261,416 B2 * | 9/2012 | Rothbaum | F16G 11/14 206/320 |
| 8,615,849 B2 * | 12/2013 | Rothbaum | H01F 7/0263 24/16 R |
| 2004/0173484 A1 | 9/2004 | Bates | |
| 2009/0283197 A1 | 11/2009 | Gorodisher | |
| 2011/0308049 A1 * | 12/2011 | Sun | B65D 63/1027 24/306 |

OTHER PUBLICATIONS

Product Title: MOS—Magnetic Organization System Possible Disclosure Date: Aug. 1, 2012 Website: https://www.kickstarter.com/projects/1578125715/mos-magnetic-organization-system/description See attached non-patent literature for photograph.

Product Title: Cheero Clip Possible Disclosure Date: Jan. 27, 2014 Website: https://www.amazon.com/cheero-CHE-306-SET-Multi-CLIP/dp/B00I2JAJAW/ref=sr_1_1?ie=UTF8&qid=1496356552&sr=8-1&keywords=asin+B00I2JAJAW See attached non-patent literature for photograph.

Product Title: Spot for Earphones Possible Disclosure Date: Jun. 16, 2010 Website: http://the-gadgeteer.com/2010/06/16/spot-for-earphones-review/See attached non-patent literature for photograph.

Product Title: Oli Magnetic Paper Clip Possible Disclosure Date: Dec. 13, 2012 Website: http://blog.shoplet.com/office-supplies/best-of-office-weekend-roundup-127/attachment/olli-magnetic-paper-clips/ See attached non-patent literature for photograph.

* cited by examiner

ELONGATE ATTACHABLE FLEXIBLE MAGNETIC ARTICLE HOLDER

PRIORITY NOTICE

The present application claims priority under 35 U.S.C. §119(e) to U.S. Provisional Patent Application Ser. No. 61/937,958 filed on Feb. 10, 2014, the disclosure of which is incorporated herein by reference in its entirety.

TECHNICAL FIELD OF THE INVENTION

The present invention relates in general to tools for organizing various elongate articles and more specifically to an elongate article holder for organizing various elongate articles such as cables and cords by providing various elongate holder embodiments with two separate and integral means for attaching to articles such as cables and the like.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Along with a proliferation of consumer electronic devices there has been an increase in the number of associated cables that provide electrical power and data transmission to such consumer electronic devices. As a result there is a need to manage and organize such cables. Managing and organizing such cables includes the need to manage and organize such cables while the cables are in storage, while the cables are in transport, and while the cables are in use.

The art has responded to such needs with various cable holders and cable ties. Cable ties generally comprise a band of some sort with two terminal ends. Such cable ties generally function to manage and organize cables by a user first coiling the cable and then using the cable tie's band to wrap around the coiled cable, securing the coil. And once the cable tie's band has wrapped around the coiled cable, the two terminal ends are secured to each other by various securing means (e.g. twists, magnets, VELCRO (plurality of hooks and complimentary loops), hooks, clips, snaps, and ratchet style locking mechanisms).

For example, the art teaches various disposable cable ties, such as short metal wires (often covered by plastic or paper) generally referred to as twist ties. Or another example is disposable plastic cable ties with a ratchet style locking mechanism to secure the two terminal ends of the cable tie.

However, disposable cable ties as taught by the current state of art created at least three new problems: (1) a problem of waste; (2) a problem of being impractical; and (3) a problem of being too simple such that there is a loss in functionality.

As a general rule, disposable products in contrast to a comparable reusable product create excessive waste, putting additional pressure on limited resources, such as land-fill space. To address this problem, the art does teach reusable cable ties.

However, the problem with reusable cable ties, as currently taught, is the cost to produce reusable cable ties is significantly higher than comparable disposable cable ties. It would be desirable to produce a reusable cable holder with a manufacturing cost on the same order of magnitude as current disposable cable ties or at the very least cheaper than current reusable cable holder manufacturing costs.

For situations that involve the repetitive need to manage and organize cables, use of disposable cable ties which are not reusable becomes impractical. For example, consider a user who on a daily basis transports a plurality of electronic devices to and from work, such as a laptop, smartphone, and tablet device—all each having their own cables. It would be impractical for the user to use non-reusable cable ties in this all too common scenario and thus it would be desirable to have a cable holder which may be reusable.

Additionally, because disposable cable ties are made with a primary purpose of keeping manufacturing costs down, such disposable cable ties have only a bare minimum of functionality, such as the band with the means for securing the two terminal ends to each other, and with no additional features nor functionality, e.g. twist ties. Thus, the goal of making a cable tie disposable has an inherent problem of providing less functionality to best manage and organize cables, which results from keeping manufacturing costs to a minimum.

In order to combat this problem of over simplicity associated with existing disposable cable ties, it would be desirable to provide a cable holder with two separate means for attaching to a respective cable. The first means of attaching such a cable holder to a cable has already been discussed above, i.e. the band like structure which may wrap around the coiled cable and the terminal ends then being secured to each other to secure the coils together.

It would be desirable if an additional attachment means were utilized, such that the cable holder could first be attached to a cable, whether the cable was coiled or not, such that the cable holder would necessarily always be present when the cable needed to be coiled, e.g. such that the cable holder and the cable may be removably paired together. By "additional attachment means," reference to using a second fastening means is intended that may be independent of a cable holder's ability to wrap around a cable or coil. However, where the art has added such an additional attachment feature, the art has utilized additional connection hardware (e.g. snaps and clips), not integral to the cable holder itself and thus such cable holders that currently exist in the art, with an additional attachment feature, are considerably more expensive to manufacture than the too simple disposable cable ties, such as twist ties. It would be desirable to provide a cable holder with an additional attachment means which is integral to the cable holder and thus minimizes increases in manufacturing cost.

Additionally, because the art has used additional connection hardware to achieve the additional attachment feature, such as snaps and clips, this creates two other problems: (1) rigidity; and (2) unnecessary complexity or too much complexity. The use of snaps and clips as means of connecting a cable holder to a cable includes an inherent property of the snap and clip which is rigidity. And rigidity necessarily means a limit to the diameter of cable which the snap and clip may attach to, i.e. some cable diameters will be too large and some too small for a given rigid snap or clip to attach to. In other words such existing snaps and clips, which are rigid, have no adjustability feature because of the rigidity.

In contrast, if the additional attachment feature was achieved with an elastic stretchable material, a greater array of cable diameters could be accommodated, which increases the usefulness of such a cable holder. Further, the use of a rigid snap or clip also generally permits the snap or clip to slide along the longitudinal length of the attached to cable which may be undesirable because there is a loss in the ability to keep the cable holder in a fixed position with respect to the cable. It would be desirable if the additional attachment means included a friction device to limit such longitudinal sliding along a given length of cable. And lastly, realizing the additional attachment feature by use of additional connection hardware tends to result in an overall cable holder which is unnecessarily complex and thus the art has moved from being too simplistic with the disposable cable ties to being too complex with cable holders that include an additional attachment feature. It would be desirable to provide a cable holder with an additional attachment means where such a feature retains operational simplicity, but without comprising functionality.

Additionally, with respect to cable ties with ratchet style locking mechanisms, such disposable cable ties have a problem of the locking mechanism being unlockable. Thus if a locking mechanism is locked too tightly or simply locked by mistake, such locking cannot be undone and may require the too tight cable tie being cut-off and a new cable tie utilized. Thus it would be desirable to provide a cable holder which may be removably coupled to a given cable.

Further, plastic cable ties have a problem which arises from using plastic as a material of construction because while plastics can be manufactured with a geometry to provide a flexible cable tie, such cable ties are not elastic, which limits the size of circumference that the cable tie's band may circumscribe. That is many plastic formulations as a material of construction does not provide much ability to stretch the material to wrap around a larger bundle of cables. However, plastic cable ties, despite not being stretchable, may be a durable choice of material of construction. It would be desirable if cable holder exhibited elastic properties to accommodate stretching around a greater range of circumferences per a given length the band of such a cable holder. Additionally, it would be desirable for such a material of construction to also be a durable material of construction, so the material may also realize the reusable objective.

The art also teaches use of a means for removably securing the two terminal ends of the band using magnets. Use of magnets does provide the benefit of operational simplicity. However, such magnetic cable holding devices as currently taught by the art do exhibit a number of problems.

For example, in one such cable holder the magnets are housed in a tubular sheath and also require a backing plate to maintain the magnets in proper location within the tubular sheath. Such related art thus provides excessive limitations within the cable holder device. It would be desirable to provide a magnetic cable holder that does not require housing the magnets in a tubular sheath and also does not require use of any backing plates.

Additionally in some of the related art of magnetic cable holders, the magnets used have a substantial surface exposed to the environment. Exposing a surface of the magnet to the environment creates several problems. Such exposure increases the probability of the magnet escaping the cable holder and rendering the cable holder non-functional. And such exposure increases the amount wear, tear, and possible damage to the magnet, i.e. exposing the magnet's surface lowers the cable holder's durability. It would be desirable to provide a magnetic cable holder where the surfaces of the magnet are substantially protected from the environment.

To a certain degree the art has responded to this exposure of a surface of the magnets by completely enclosing the magnets within the two terminal regions of a band. While completely enclosing the magnets is one solution to the problems associated with exposing a magnet surface to the environment, such a solution creates a new problem.

By completely enclosing the magnet within a material, there is an inherent decrease in magnetic closure strength because of the additional distance between the magnets and the terminal surface (outer surface), which separates the magnets further in distance when the cable holder is closed. As is well known even a small change in the distance separating two magnets has a great impact upon the magnetic field as magnetic field strength is inversely proportional to the square of the separation distance. Additionally, completely enclosing magnets also forces the magnetic field to pass through a solid material which also may decrease the strength of the magnetic field.

One solution to this decrease in magnetic closure strength may be to use stronger magnets. However, that solution increases manufacturing costs and makes the cable holder bigger and heavier. An alternate solution may be to enclose the magnets within a thin surface. However, such an approach would increase the chances of surface tear and lower the cable holder's durability. It would be desirable to provide a magnetic cable holder where the substantial surfaces of the magnet may not only be protected from the environment, but where the manner of protecting the magnets from the environment may be durable and may not diminish the magnetic closure strength as much as totally enclosing the magnet within a material of construction would diminish the magnetic closure strength.

There is a need in the art for a cable holder which can provide the various desirable features and objectives as described above.

It is to these ends that the present invention has been developed.

BRIEF SUMMARY OF THE INVENTION

To minimize the limitations in the prior art, and to minimize other limitations that will be apparent upon reading and understanding the present specification, the present invention may describe a portable elongate article holder (elongate article holder) comprising structure to organize an elongate article. Such an elongate article holder may comprise a flexible non-magnetic band, along with two terminal ends disposed opposite of each other. Various means of securing the two terminal ends to each other may be disclosed, such that the band may wrap around the elongate article or coils of the elongate article and by doing so the elongate article may be removably held.

In various exemplary embodiments this means of securing the two terminal ends may be provided by magnets (or at least two magnetic regions), located in a respective cavity in each respective terminal end, where such magnets may be substantially protected from environmental harm while simultaneously maintaining magnetic closure strength by use of a plurality of tubular apertures which run from the cavity housing the magnet to a mating surface of a respective terminal end.

Further, in some embodiments, the elongate article holder's band may also comprise an integral closed loop which may be an additional and independent, means for removably attaching to the elongate article, which may operate by passing a portion of the elongate article through an inner circumference of the integral closed loop. Furthermore in some embodiments, the integral closed loop may frictionally grip the portion of the elongate article passing through the inner circumference of the integral closed loop so as to maintain the elongate article holder and the elongate article in a desired conformation (i.e. in a relative fixed position).

It is an objective of the present invention to provide an elongate article holder with two separate, but complimentary means, for attaching to a respective elongate article.

It is another objective of the present invention to provide an elongate article holder where the two separate, but complimentary means, for attaching to the respective elongate article are each integral with the elongate article holder, such that both attachment means do not require use of additional connection hardware.

It is another objective of the present invention to provide an elongate article holder where the first means of attaching to the elongate article allows the elongate article and the elongate article holder to remain in a fixed position with respect to each other, by providing frictional resistance to mitigate the elongate article holder sliding along the longitudinal length of the elongate article. That is, it may be an objective to removably pair the elongate article holder with the article, such that the two may be associated with each other.

It is another objective of the present invention to provide an elongate article holder where a second means of attaching to the elongate article allows may comprise wrapping (circumscribing) a length of the elongate article holder around the article(s) or coil of article(s) and having the two terminal ends of the elongate article holder removably attach to each other.

It is another objective of the present invention to provide an elongate article holder where both of the two attachment means may be removably coupled to the elongate article, such that the elongate article holder may be completely removed from the elongate article.

It is another objective of the present invention to provide an elongate article holder where in some exemplary embodiments the primary material of construction exhibits an elastic property, such that the elongate article holder may be stretched to accommodate both elongate articles with a variety of diameters and to accommodate coils and bundles of elongate articles that would may require a large length of the elongate article holder's band to circumscribe (wrap around) such a coil or bundle of article(s).

It is another objective of the present invention to provide an elongate article holder in exemplary embodiments which may utilize a magnet or magnets to removably couple the two terminal ends of the elongate article holder, where such magnets need not be housed in a tubular sheath.

It is another objective of the present invention to provide an elongate article holder in exemplary embodiments which may utilize a magnet or magnets to removably couple the two terminal ends of the elongate article holder, where such embodiments require no use of backing plates.

It is another objective of the present invention to provide an elongate article holder in exemplary embodiments which my utilize a magnet or magnets to removably couple the two terminal ends of the elongate article holder, where the surfaces of such magnets are substantially protected from the environment, but while still maintaining the magnetic closure strength necessary for the removable coupling of the two terminal ends.

It is another objective of the present invention to provide an elongate article holder where the choices of material of construction employed and overall elongate article holder geometry results in an elongate article holder that may be durable.

It is another objective of the present invention to provide an elongate article holder that may be operationally simple to use while providing the full functionality of having two separate attachments means.

It is yet another objective of the present invention to provide an elongate article holder that may be reusable, but with relatively low manufacturing costs, on the order of magnitude of the costs associated with manufacturing disposable cable ties or at least less expensive that current reusable cable ties.

These and other advantages and features of the present invention are described herein with specificity so as to make the present invention understandable to one of ordinary skill in the art.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Figure 1A:
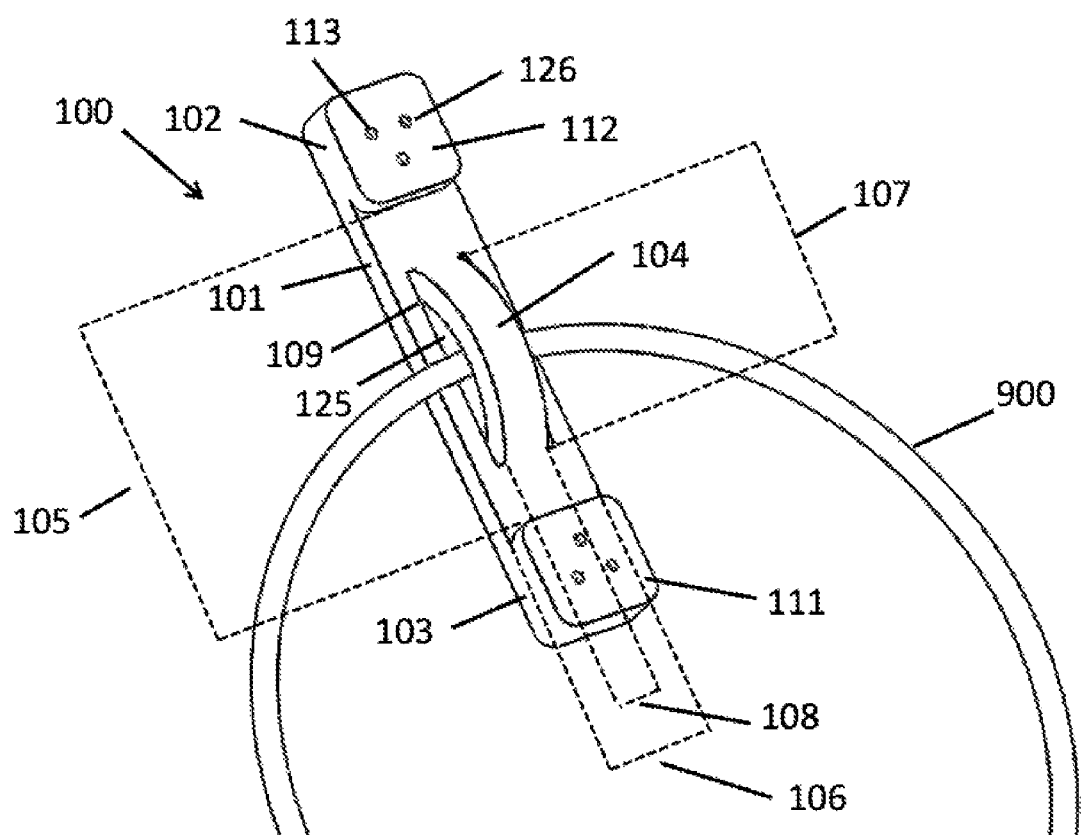
FIG. 1A may depict an exemplary embodiment of a portable elongate article holder (elongate article holder) with a portion of an elongate article may be passing through an orifice formed in part from an integral closed loop of the elongate article holder, shown from a perspective view.

REFERENCE NUMERAL LISTING/SCHEDULE 100 elongate article holder 100 (e.g. portable elongate article holder 100)
101 flexible non-magnetic band 101
102 first terminal end 102
103 second terminal end 103
104 integral closed loop 104
105 first longitudinal length 105
106 first transverse width 106
107 second longitudinal length 107
108 second transverse width 108
109 first longitudinal slot 109
110 second longitudinal slot 110
111 first mating surface 111
112 second mating surface 112
113 tubular aperture 113
114 first magnet 114 or magnetically attractable material 114
115 first cavity 115
116 second magnet 116 or magnetically attractable material 116
117 second cavity 117
118 first un-coupled thickness 118
118a first coupled thickness 118a (e.g. magnetically compressed coupled thickness 118a)
119 second un-coupled thickness 119
120 first back thickness 120
121 second back thickness 121
122 formed receiving cavity 122
123 terminal end thickness 123
124 band thickness 124
125 orifice 125
126 tubular dimple 126
400 elongate article holder 400
401 flexible non-magnetic band 401
402 first terminal end 402
403 second terminal end 403
411 first mating surface 411
412 second mating surface 412
413 tubular aperture 413
414 first magnet 414 or magnetically attractable material 414
415 first cavity 415
416 second magnet 116 or magnetically attractable material 416
417 second cavity 417
422 formed receiving cavity 422
900 elongate article 900 (e.g. data transmission cable 900 and/or power charging cable 900)

DETAILED DESCRIPTION OF THE INVENTION

A portable elongate article holder (elongate article holder) comprising structure to organize at least one or more elongate articles is discussed and disclosed. A main subcategory of elongate articles may be cables, such as data transmission and electrical power transmission cables for various electronic devices. Another subcategory of elongate articles may be cords, such as electrical power cords, extension cords, and the like. Another subcategory of elongate articles may be cords of medical devices. Another subcategory of elongate articles may be cords, wires, and/or cables for transmitting auditory signals (e.g. earphones and headphones).

In various exemplary embodiments, such an elongate article holder may comprise a flexible non-magnetic band, two terminal ends (e.g. a first terminal end and a second terminal end), and a means for removably coupling the terminal ends to each other. The two terminal ends and the flexible non-magnetic band may all be in physical communication with each other, such that each of these elements may all physically connect to each other and do so within a same longitudinal length. Each of these elements may be briefly discussed below.

In various further exemplary embodiments, the flexible non-magnetic band may further comprise an integral closed loop for attaching the portable elongate article holder to the elongate article. In such embodiments, a portion of the elongate article may be passed through an orifice formed by the integral close loop and flexible non-magnetic band. Such a passing through may result in the elongate article holder becoming removably attached to the elongate article. By "integral" it may be intended that the flexible non-magnetic band and the integral closed loop may be manufactured as a single part, i.e. as a single article of manufacture. Furthermore in some exemplary embodiments, such a single article of manufacture may be of a single material of construction.

Spatially, the integral closed loop may be located within the flexible non-magnetic band and disposed between the two terminal ends. The integral closed loop may have a characteristic length and width. Where the flexible non-magnetic band may comprise a first longitudinal length and first transverse width that may be substantially perpendicular with each other. The longitudinal length of the flexible non-magnetic band may be a major length of the flexible non-magnetic band. And the first transverse width may be a major width of the flexible non-magnetic band. The integral closed loop may comprise a second longitudinal length and a second transverse width, substantially perpendicular to each other. In various exemplary embodiments, the second longitudinal length may be less than or equal to the first longitudinal length. In various exemplary embodiments, the second transverse width is less than the first transverse width. Additionally, the second longitudinal length may be substantially parallel to the first longitudinal length.

Note, when "substantially" may be used with respect to parallel or perpendicular, such use may simply denote that elements may not be technically absolutely parallel or perpendicular, but may diverge from technical absolute parallelism or perpendicularism by two degrees or less.

Furthermore, in some exemplary embodiments, the integral closed loop may be formed by employing (locating) two slots or slits in the flexible non-magnetic band that wherein each slot may be substantially parallel to the other slot. In some embodiments, each slot may comprise a depth equal to a band thickness, wherein the band thickness may be a thickness of the flexible non-magnetic band. Additionally, in some embodiments, each slot may be substantially parallel to the first longitudinal length, which then may necessarily result in formation of the integral closed loop as described above. That is, when the flexible non-magnetic band and the integral closed loop are not under any load or stress, each may share a same longitudinal plane concurrently.

Further still, in some exemplary embodiments, the second longitudinal length, along with a chosen material of construction (e.g. silicone or other elastomer) may allow the integral closed loop to frictionally grip the portion of the elongate article which may passes through the orifice. Such frictional gripping may result in a tendency for the elongate article holder and the elongate article to maintain a fixed position with respect to each other.

In some embodiments, each of the two terminal ends, the first terminal end and the second terminal end, may comprise a respective mating surface, i.e. a first mating surface and a second mating surface. The means for removably coupling the two mating surfaces to each other may permit the first mating surface and the second mating surface to come into physical contact with each other and such that each mating surface may be parallel to the other respective mating surface.

Removably coupling the first terminal end to the second terminal end may result in the flexible non-magnetic band creating (forming) a formed receiving cavity that may hold an elongate article or coil of elongate article within the formed receiving cavity. The formed receiving cavity may circumscribe at least one different portion of the elongate article (different from the portion that may be passing through the orifice) that may be held by the orifice; or the formed receiving cavity may circumscribe a portion of a different elongate article. In some further exemplary embodiments, where the flexible non-magnetic band may comprise an elastic property, the created formed receiving cavity may more securely hold the elongate article or coil of elongate article.

The means for removably coupling the first terminal end to the second terminal end may comprise use of VELCRO (e.g. a plurality of hooks on one mating surface complimentary to a plurality of hoops located on the other mating surface), magnets (or a magnet and magnetically attractable material), clasps, snaps, clips or any combination of the like affixed to each respective mating surface that may be suitable for removably coupling each mating surface to the other.

In various exemplary embodiments, the means for removably coupling the first terminal end to the second terminal may utilize magnets, or one magnet and one magnetically attractable material. In such embodiments, the use of a magnet, magnets, or magnet and magnetically attractable material, may provide for a magnetic closing strength between the two terminal ends, such that the two terminal ends may removably couple to each other. In either embodiment, the magnets or the one magnet and one magnetically attractable material may be housed in a respective cavity located in each of the respective terminal ends.

In order to protect such employed magnets (and/or magnetically attractable material) from environmental harm due to possible contact with the environment, the surfaces of such magnets and the magnets themselves may be substantially isolated from direct physical contact with the environment by the cavity partially enclosing the magnet (and/or magnetically attractable material) and functionally encapsulating a given magnet (and/or magnetically attractable material) within a respective terminal end. Use of "substantially" here may note that the magnet may not be entirely enclosed, as each terminal end may comprise one or more tubular apertures, which do permit some communication with external environments.

In embodiments, not necessarily exemplary, where the magnets are totally encapsulated within a cavity of each terminal end, a problem may arise in that total encapsulation necessarily reduces the magnetic closure strength by increasing the distance between the magnets and the terminal's surface by a thickness of the encapsulating material(s) and forcing the magnetic field to pass through a solid material. Given a same temperature and pressure, a solid material inherently has lower electromagnetic field permeability than a gas like air.

Further, in order to avoid the above problem created by total encapsulation of the magnets in the terminal end cavities, but while still protecting the magnets from environmental harm, a partial enclosure solution may maintain magnetic closure strength by utilizing a plurality of apertures, such as tubular apertures, which may run from a given mating surface to the cavity housing a given magnet. Use of such tubular apertures which may contain air (within the aperture void) may help to facilitate magnetic field strength, since magnetic field strength is diminished less in air than through a solid material.

For example and without limiting the scope of the present invention, the first terminal end may house a first magnet in a first cavity. The plurality of apertures may comprise three distinct tubular apertures running directly from the first mating surface to the first cavity. Such a geometric arrangement may be repeated on the second terminal end where a second magnet (magnetically attractable material) may be similarly housed. Then when the first mating surface may be brought together with the second mating surface, the presence of the six tubular apertures may operate in at least two ways to preserve the magnetic closure strength of the resulting removable coupling. First, the six tubular apertures may provide a region where the resulting void space is only filled with air which may hinder the magnetic field lines less than a solid material. Second, the six tubular apertures may facilitate the magnetic coupling to compress the material in between the two magnets more so as compared to a structure with no tubular apertures (because there is less solid material to compress by using such tubular apertures), allowing for an even stronger magnetic coupling by reducing the separation distance between the magnets. Note, the second operation of material compression may be dependent upon the terminal end's material of construction including an elastic property which permits compressibility, such as some silicone formulations.

In various exemplary embodiments, each tubular aperture may have a two dimensional shaped opening wherein the two dimensional shaped opening may be continuously propagated through an entire length of each tubular aperture. Additionally, the two dimensional shaped opening may be selected from a group consisting of a polygon (regular and/or irregular), a circle, an ellipse, an amorphous arcuate shape, and the like. That is, the tubular apertures may have different shapes but still function as the tubular aperture described above.

In various exemplary embodiments, the first terminal end, the flexible non-magnetic band, the second terminal end, the first mating surface, the second mating surface, and the integral closed loop may all comprise the same materials of construction. Furthermore, such materials of construction may be a single material. For example, various plastics may provide the requisite flexibility. But in other exemplary embodiments where elasticity may be desired, then the material of construction may comprise a rubber latex compound, a silicone elastomer compound, a neoprene compound, and the like.

In the exemplary embodiment using two magnets within respective cavities, the first terminal end, the flexible non-magnetic band, the second terminal end, the first mating surface, the second mating surface, and the integral closed loop may all be molded as a single part, with the magnets inserted prior to mold closure. And such a mold may also accommodate creating the plurality of apertures located in each terminal end for maintaining magnetic closure strength.

In other embodiments, the first terminal end, the flexible non-magnetic band, the second terminal end, the first mating surface, the second mating surface, and the integral closed loop may be formed from strapping (e.g. a woven strip of nylon strap). Strapping may be synthetic or natural. Typical synthetic strapping materials include nylon, polypropylene, and polyester. Typical natural strapping materials include cotton, wool, hemp, and leather. The two terminal ends with respective mating surface may be formed by folding over the ends of a length of strapping and either then sewing the edges to form the terminal ends or using ultrasonic welding if the strapping may be synthetic. The integral closed loop may be formed by cutting slots or slits into the flexible non-magnetic band or by sewing or ultrasonically welding another piece of strapping onto the flexible non-magnetic band portion of strapping. Furthermore, the terminal regions may utilize various removable closure means, such as, but not limited to, VELCRO, clips, snaps, hooks, buttons, and the like as the removable coupling means.

In embodiments using magnets, the plurality of apertures could be cut into the respective mating surfaces—although the desirable compression feature when the two mating surfaces are brought together may not be realized when using strapping, as many strapping materials of construction may not be elastic. Note, such strapping may provide the requisite flexibility and generally may not provide elasticity and thus may not an exemplary material of construction for some embodiments of the present invention.

Note with respect to materials of construction, it is not desired nor intended to thereby unnecessarily limit the present invention by reason of such restricted disclosure.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1A may depict an exemplary embodiment of portable elongate article holder (elongate article holder) 100 with a portion of elongate article 900 passing through an orifice 125 formed in part from integral closed loop 104 of elongate article holder 100, shown from a perspective view.

Figure 1B:
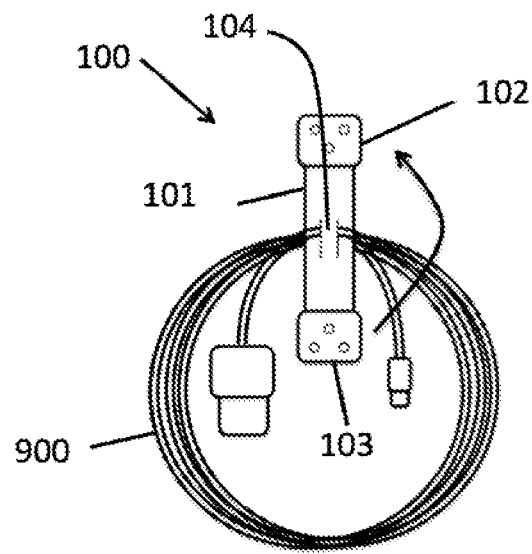
FIG. 1B may depict the exemplary embodiment of FIG. 1A, wherein the elongate article holder with the portion of the elongate article passing through the orifice formed in part from the integral closed loop where the elongate article holder may be laying open and on top of a coil of the elongate article, shown from a top view.

FIG. 1B may depict an exemplary embodiment of elongate article holder 100 with the portion of elongate article 900 passing through orifice 125 (not depicted in FIG. 1B) and where elongate article holder 100 may be may be laying open and on top of a coil of elongate article 900, shown from a top view.

Figure 1C:
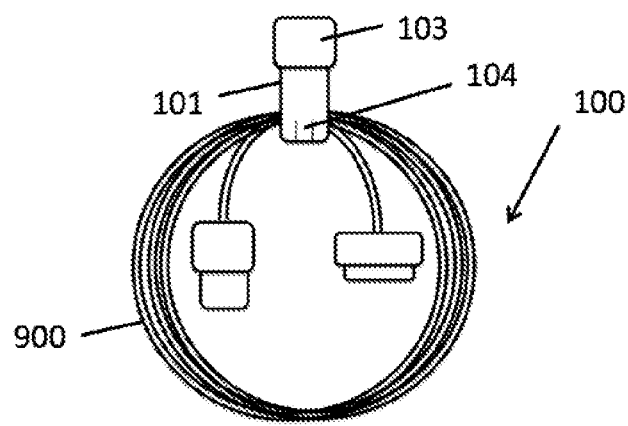
FIG. 1C may depict the exemplary embodiment of FIG. 1A, wherein the elongate article holder with the portion of the elongate article passing through the orifice formed in part from the integral closed loop where the elongate article holder may be closed, such that the elongate article holder may now be holding the coil of the elongate article, shown from a top view.

FIG. 1C may depict an exemplary embodiment of elongate article holder 100 with a portion of elongate article 900 passing through orifice 125 (not depicted in FIG. 1C) and where elongate article holder 100 may be closed forming the formed receiving cavity, such that elongate article holder 100 may be now holding the coil of elongate article 900 within the formed receiving cavity, shown from a top view.

In some exemplary embodiments, elongate article holder 100 may comprise a flexible non-magnetic band 101, two terminal ends (e.g. first terminal end 102 and second terminal end 103), and a means for removably coupling the two terminal ends together. In some exemplary embodiments, flexible non-magnetic band 101 may comprise integral closed loop 104. In some exemplary embodiments, integral closed loop 104 may be for attaching portable elongate article holder 100 to elongate article 900 by a portion of the elongate article 900 passing through an orifice 125. Orifice 125 may be formed between integral closed loop 104 and a portion of the flexible non-magnetic band 101. The two terminal ends may be disposed opposite of each other with flexible non-magnetic band 101 disposed between the two terminal ends, with each terminal end comprising a mating surface (e.g. first mating surface 111 and second mating surface 112, respectively). Each terminal end may be structurally and functionally equivalent and/or identical. Each mating surface may be structurally and functionally equivalent and/or identical.

When the means for removably coupling the two terminal surfaces together (or for removably coupling the two mating surfaces together), has the two mating surfaces removably coupled together, each mating surface may be in physical contact with each other and each mating surface may be substantially parallel with each other. When the two mating surfaces may be removably coupled to each other, flexible non-magnetic band 101 may form a formed receiving cavity 122. Formed receiving cavity 122 may circumscribe at least one different portion of elongate article 900 or a portion of a different elongate article 900.

In some exemplary embodiments, flexible non-magnetic band 101, including the integral closed loop 104, and the two terminals ends may all be integral with respect each other.

In some embodiments, flexible non-magnetic band 101, including integral closed loop 104, and the two terminal ends may be all manufactured as a single article of manufacture.

The FIG. 1 series of figures taken together may illustrate an exemplary use of elongate article holder 100 in how elongate article holder 100 may hold, manage, and/or organize one or more elongate articles 900. Some exemplary uses may comprise at least three steps. If it may be desirable to maintain elongate article 900 and elongate article holder 100 in relative fixed positions with respect to each other, e.g. it may be desirable to have elongate article 900 and elongate article holder 100 travel together so elongate article holder 100 may be always available for use in holding elongate article 900, then the first step may be to insert a portion, e.g. an end, of elongate article 900 through orifice 125. See e.g., FIG. 1A. Once the portion of elongate article 900 may be inserted through orifice 125, elongate article 900 may be removably coupled to elongate article holder 100. This may be the configuration depicted in FIG. 1A.

In some embodiments, orifice 125 may frictionally holds the portion of the elongate article 900 removably passing through orifice 125, such that the elongate article 900 and the portable elongate article holder 100 remain in a fixed position with respect to each other.

Further, in various exemplary embodiments, integral closed loop 104 may be dimensionally sized such that integral closed loop 104 may frictionally grip the portion of elongate article 900 which may be inserted through orifice 125.

Additionally, the choice of material of construction of integral closed loop 104 and flexible non-magnetic band 101 may be such that the frictional gripping property may be enhanced, e.g. various latex rubbers and silicones may have gripping properties.

In some embodiments, when elongate article holder 100 may be substantially constructed from an elastomer material of construction, such as a rubber or silicone, wherein such materials of constructions may comprise an inherent quality of being tacky with respect to the sheathing materials of construction typical of cables, sliding movement between orifice 125 and article 900 may be minimized. In addition or alternatively, in some embodiments, when elongate article holder 100 may be substantially constructed from an elastomer material of construction, such as silicone, orifice 125 may elastically grip the portion of elongate article 900 passing through orifice 125. Thus, in some embodiments, the frictional holding capacity of orifice 125 may be at in part derived from choice of elongate article holder 100 material of construction.

In the second exemplary step, elongate article 900 may be coiled.

And in the third exemplary step, coiled elongate article 900 may be held securely by wrapping flexible non-magnetic band 101 around coiled elongate article 900, allowing first terminal end 102 to removably couple with second terminal end 103. This may be the configuration depicted in FIG. 1C. The depiction shown in FIG. 1B may be an intermediary step in arriving at this third exemplary step, where in FIG. 1B elongate article holder 100 may be placed on top of coiled elongate article 900 in preparation of wrapping flexible non-magnetic band 101 around coiled elongate article 900. In some embodiments, wrapping flexible non-magnetic band 101 around coiled elongate article 900 such that the first mating surface 111 may be removably coupled to second mating surface 112 may form formed receiving cavity 122 (shown e.g. in FIG. 3), wherein the formed receiving cavity 122 may circumscribe coiled elongate article 900.

Note, depending upon the thickness or diameter of coiled elongate article 900, flexible non-magnetic band 101 may wrap around coiled elongate article 900 more than once.

Additionally, in exemplary embodiments where flexible non-magnetic band 101 may have an elastic property, flexible non-magnetic band 101 may hold coiled elongate article 900 more securely than flexible non-magnetic band 101 without an elastic property.

By flexible non-magnetic band 101 wrapping around and holding coiled elongate article 900 (e.g. by forming formed receiving cavity 122), elongate article 900 may be maintained in an organized fashion by elongate article holder 100.

Now turning to a discussion of the FIG. 2 series of figures. FIG. 2A may depict the exemplary embodiment of elongate article holder 100, shown from a perspective view. Elongate article 900 upon which the elongate article holder 100 operates may be not depicted in FIG. 2A.

Figure 2A:
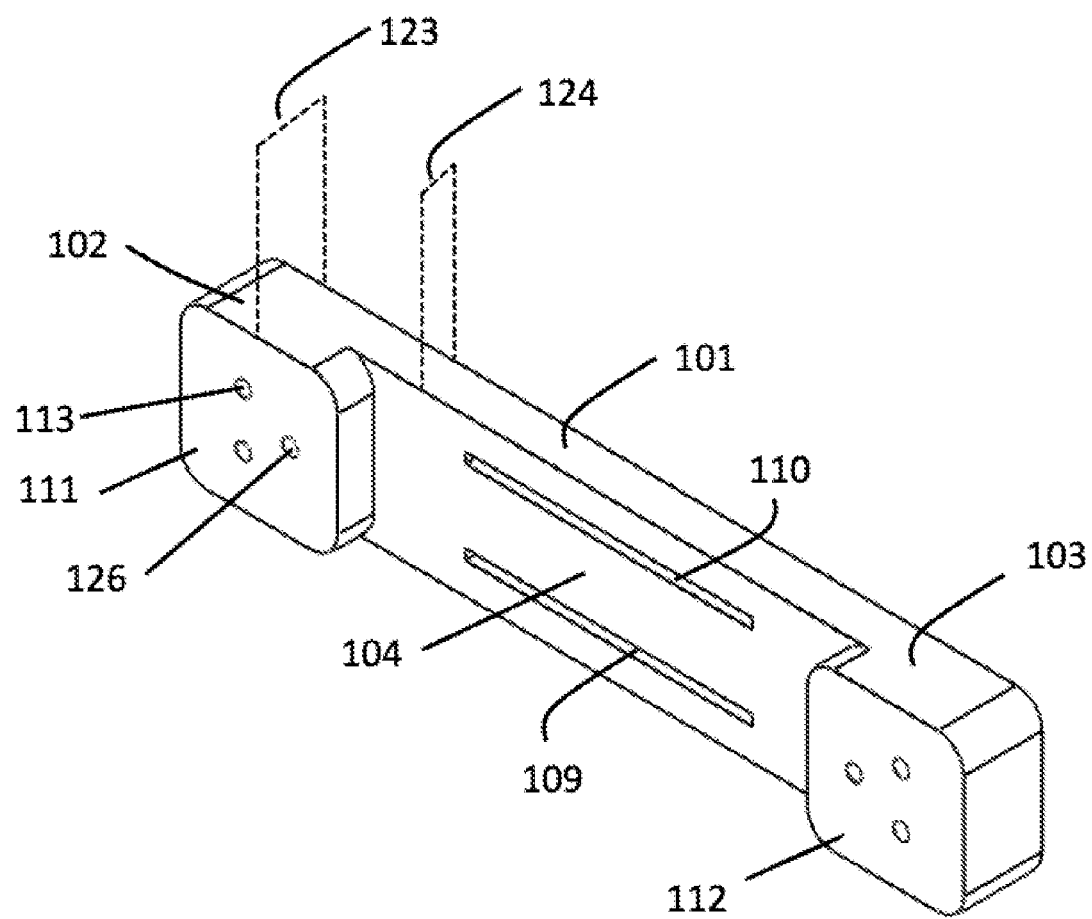
FIG. 2A may depict an exemplary embodiment of FIG. 1A, of the elongate article holder, shown from a perspective view. An elongate article upon which the elongate article holder operates is not depicted in FIG. 2A.
Figure 2B:
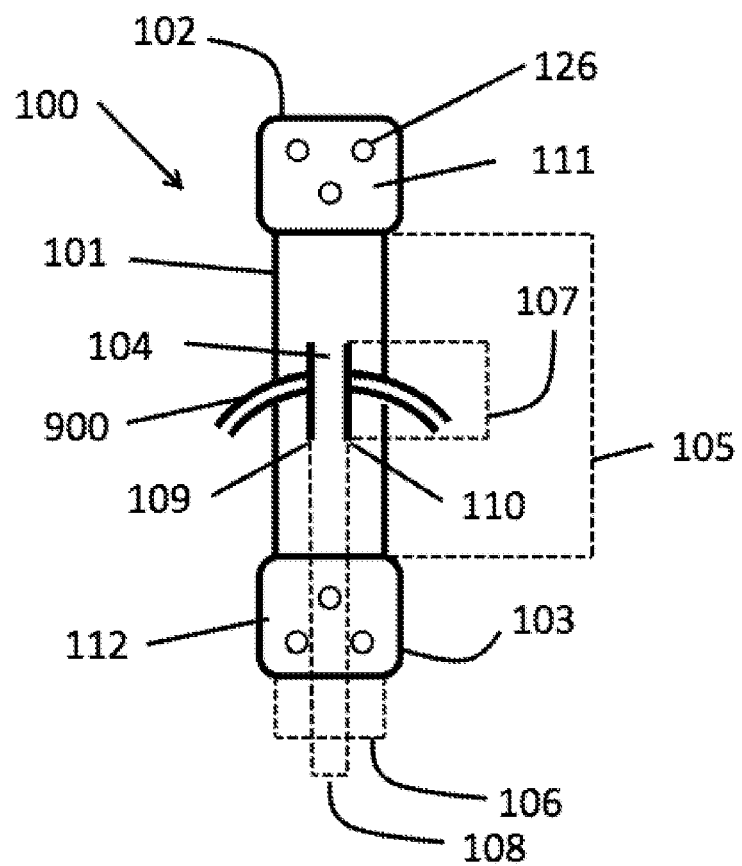
FIG. 2B may depict an exemplary embodiment of FIG. 1A, of the elongate article holder, shown from a top view. The portion of the elongate article may be shown passing through the integral closed loop of the elongate article holder.

FIG. 2B may depict the exemplary embodiment of elongate article holder 100, shown from a top view. A portion of elongate article 900 may also be shown passing through orifice 125, although because of the top view, orifice 125 may not be readily visible.

Figure 2C:
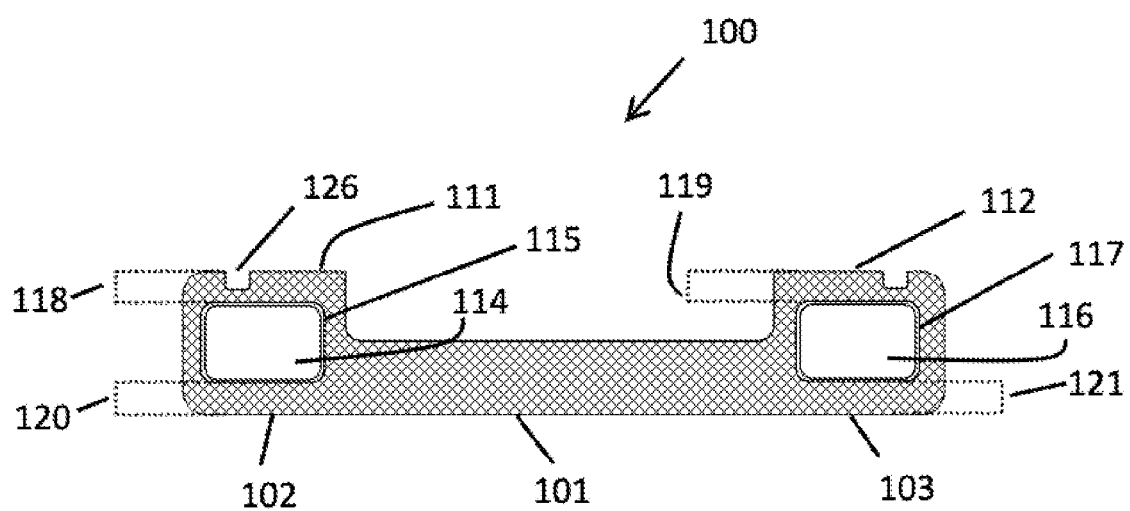
FIG. 2C may depict an exemplary embodiment of FIG. 1A, of the elongate article holder, shown from a longitudinal cross-sectional side view. An elongate article upon which the elongate article holder operates is not depicted.

FIG. 2C may depict the exemplary embodiment of elongate article holder 100, shown from a longitudinal cross-sectional side view. Elongate article 900 upon which the elongate article holder 100 operates may not be depicted in FIG. 2C.

Figure 2D:
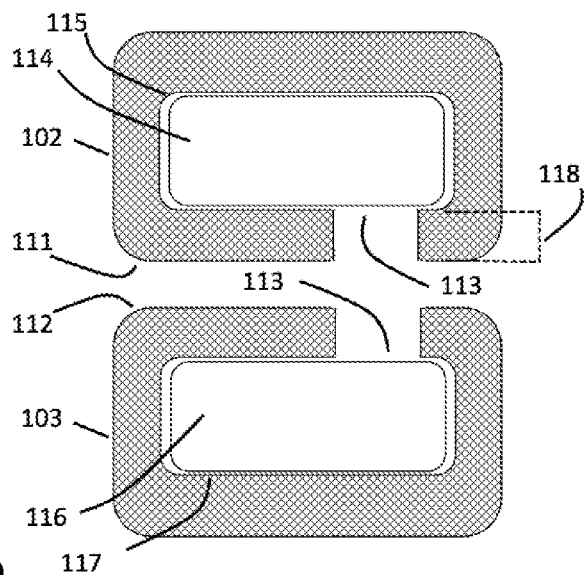
FIG. 2D may depict an exemplary embodiment of a first terminal end and a second terminal end of the elongate article holder prior to removably coupling the two terminal ends to each other, shown from a cross-sectional side view. An elongate article upon which the elongate article holder operates is not depicted.

FIG. 2D may depict an exemplary embodiment of first terminal end 102 and second terminal end 103 of elongate article holder 100 prior to removably coupling the two terminal ends to each other, shown from a cross-sectional side view. Elongate article 900 upon which the elongate article holder 100 operates may not be depicted in FIG. 2D.

Figure 2E:
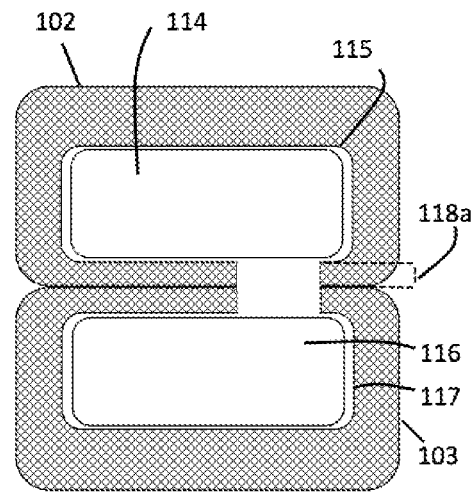
FIG. 2E may depict the exemplary embodiment of the first terminal end and the second terminal end of FIG. 2D, wherein the two terminal ends may be removably coupled to each other, shown from a cross-sectional side view. An elongate article upon which the elongate article holder operates is not depicted.

FIG. 2E may depict the exemplary embodiment of first terminal end 102 and second terminal end 103 of elongate article holder 100 where the two terminal ends may be removably coupled to each other, shown from a cross-sectional side view. Elongate article 900 upon which the elongate article holder 100 operates may not be depicted in FIG. 2E.

Note, FIG. 2A through FIG. 2C may depict the various geometry and structure of elongate article holder 100. While FIG. 2D and FIG. 2E may be intended to demonstrate a compression feature of elongate article holder 100 that may occur in some exemplary embodiments when first terminal end 102 and second terminal end 103 may be removably coupled. Also note, in FIG. 2A through FIG. 2C tubular dimple 126 may be depicted, but in FIG. 2D and FIG. 2E tubular aperture 113 may be depicted.

In the FIG. 2 series of figures, elongate article holder 100 may comprise flexible non-magnetic band 101, first terminal end 102, second terminal end 103, and a means for removably coupling first terminal end 102 to second terminal end 103. First terminal end 102, flexible non-magnetic band 101, and second terminal end 103 may all be in communication with each other, such that each of these three elements may all physically connect to each other and may do so within the same longitudinal length when elongate article holder 100 may not be holding elongate article 900.

In some embodiments, flexible non-magnetic band 101 may comprise first longitudinal length 105 and first transverse width 106 which may be substantially perpendicular to first longitudinal length 105. In some embodiments, first longitudinal length 105 may be a major length of flexible non-magnetic band 101. In some embodiments, first transverse width 106 may be a major width of flexible non-magnetic band 101. See e.g., FIG. 1A.

In various further exemplary embodiments, flexible non-magnetic band 101 may further comprise integral closed loop 104 for attaching elongate article holder 100 to elongate article 900. In such embodiments, a portion of elongate article 900 may be passed through orifice 125, which may be formed in part from integral closed loop 104 and thus result in elongate article holder 100 removably coupling to elongate article 900.

In some embodiments, integral closed loop 104 may be formed from flexible non-magnetic band 101 by placing (locating) two substantially parallel slots in flexible non-magnetic band 101. In some embodiments, each slot may comprise a depth of about equal to a band thickness 124 (see e.g., FIG. 2A). "About equal" may mean such slots may pass entirely through band thickness 124. In some embodiments, each such slot may run in a direction substantially parallel with a longitudinal length of flexible non-magnetic band 101.

In some embodiments, the two substantially parallel slots may be first longitudinal slot 109 and second longitudinal slot 110. See e.g., FIG. 2A. In some embodiments, the two substantially parallel slots need not have a same length, but instead may have two different lengths.

In some embodiments, integral closed loop 104 may be formed by employing two slots or slits (e.g. first longitudinal slot 109 and second longitudinal slot 110) in flexible non-magnetic band 101 that may be substantially parallel to first longitudinal length 105. Such slots (slits) may necessarily result in formation of integral closed loop 104 when the slot depth may be at least equal to band thickness 124. When flexible non-magnetic band 101 and integral closed loop 104 may not be under any load or stress, each may share a same concurrent longitudinal plane.

In some embodiments, integral closed loop 104 may be located within flexible nonmagnetic band 101 and disposed between first terminal end 102 and second terminal end 103. Integral closed loop 104 may comprise a characteristic length and width, second longitudinal length 107 and second transverse width 108, respectively. See e.g., FIG. 1A. For example, in FIG. 1A, the integral closed loop 104 has a second longitudinal length 107 disposed substantially at a center between terminal ends 103 and 102.

In various exemplary embodiments, e.g. FIG. 2A, second longitudinal length 107 may be less than or equal to first longitudinal length 105. In various exemplary embodiments, second transverse width 108 may be less than first transverse width 106. In some embodiments, second longitudinal length 107 may be substantially parallel to first longitudinal length 105. In some embodiments, first longitudinal slot 109, second longitudinal slot 110, first longitudinal length 105, and second longitudinal length 107 may all be substantially parallel to each other.

Orifice 125 may be formed from integral closed loop 104 and portions of flexible non-magnetic band 101 immediately proximate to integral closed loop 104. In some embodiments, the portions of flexible non-magnetic band 101 immediately proximate to integral closed loop 104 may be regions of flexible non-magnetic band 101 immediately adjacent, i.e. in physical contact, to first longitudinal slot 109 and second longitudinal slot 110, respectively. Note in FIG. 1A orifice 125 may be present; whereas, in FIG. 2A orifice 125 may not be present. In some embodiments, in order for orifice 125 to be present, some force must push integral closed loop 104 and the portions of flexible non-magnetic band 101 immediately proximate to integral closed loop 104 in opposing directions to form orifice 125. For example, and without limiting the scope of the present invention, when some portion of elongate article 900 may be pushed at first longitudinal slot 109 or second longitudinal slot 110, orifice 125 may be formed such that the portion of elongate article 900 may be passed through formed orifice 125. That is, FIG. 1A may depict orifice 125 as open and present and FIG. 2A may depicted orifice 125 as closed or temporarily absent (until formed).

Thus in some exemplary embodiments, may first longitudinal slot 109 and second longitudinal slot 110 form integral closed loop 104, and integral closed loop 104 may permit removable formation of orifice 125; and orifice 125 may permit elongate article 900 to be removably attached to elongate article holder 100.

Each of the two terminal ends, first terminal end 102 and second terminal end 103, may comprise a respective mating surface, i.e. first mating surface 111 and second mating surface 112, respectively. The means for removably coupling first terminal end 102 to second terminal end 103 (i.e. the means for removably coupling the two mating surfaces together) may permit first mating surface 111 and second mating surface 112 to come into physical contact with each other and such that each mating surface may be substantially parallel to the other respective mating surface.

Figure 3:
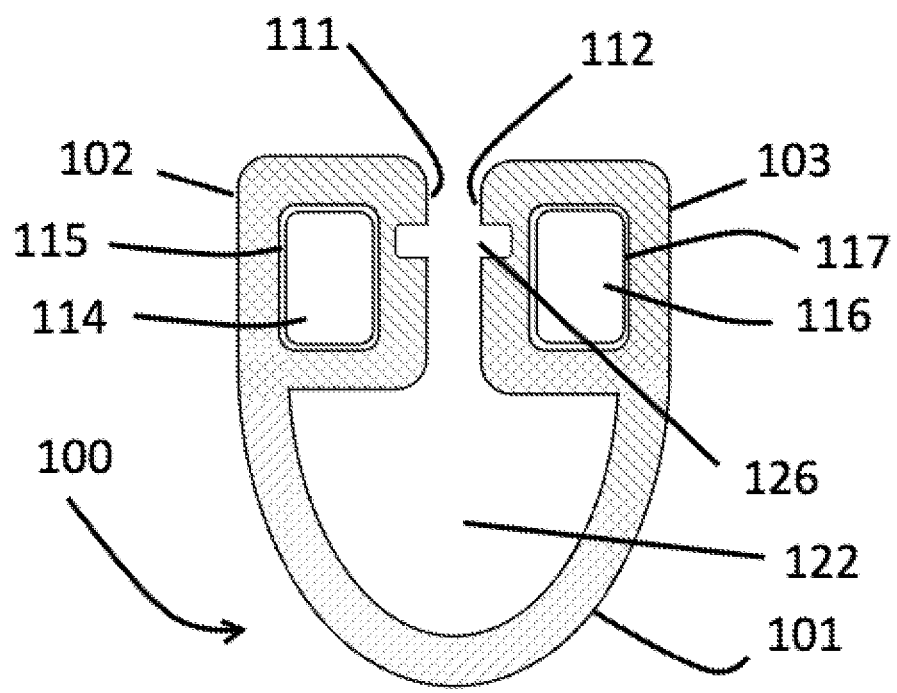
FIG. 3 may depict the exemplary embodiment of the elongate article holder of FIG. 1A or FIG. 2A as the first terminal end and the second terminal end may be being brought in proximity of each other, such that a formed receiving cavity may be created, shown from a cross-sectional side view. This formed receiving cavity may circumscribe (wrap around) various elongate articles and/or coils of elongate articles. An elongate article upon which the elongate article holder operates is not depicted.

Removably coupling first terminal end 102 to second terminal end 103 may result in flexible non-magnetic band 101 creating a formed receiving cavity 122 (see e.g. FIG. 3). In some embodiments, formed receiving cavity 122 may circumscribe at least one different portion of elongate article 900 (e.g. different from the portion that may be passing through orifice 125) or a portion of a different elongate article 900 (e.g. coils of elongate article 900). In some embodiments, formed receiving cavity 122 may removably hold elongate article 900 or some coil of elongate article 900 within formed receiving cavity 122. This may be depicted in FIG. 3. In further exemplary embodiments, where flexible non-magnetic band 101 may comprise the elastic property (characteristic), created formed receiving cavity 122 may more securely removably hold elongate article 900 or some coil of elongate article 900.

In the exemplary embodiments, the means for removably coupling first terminal end 102 to second terminal end 103 may comprise use of VELCRO (e.g. a plurality of hooks on one mating surface complimentary to a plurality of hoops located on the other mating surface), magnets, clasps, snaps, clips or any combination of the like affixed to each respective mating surface intended for the purpose of removably coupling the two respective mating surfaces together; e.g., first mating surface 111 and second mating surface 112.

With respect to a magnetically coupling means, the means for removably coupling first terminal end 102 to second terminal end 103 may utilize magnets (114 and 116), or at least one magnet 114 and one magnetically attractable material 116. See e.g., FIG. 2C. Note, reference numeral 114 may be reference to a first magnet 114; whereas, reference numeral 116 may either in reference to a second magnet 116 or a magnetically attractable material 116, whereby context it should be clear. In such embodiments, the use of first magnet 114 housed (embedded) within first cavity 115 and second magnet 116 housed (embedded) within second cavity 117; or first magnet 114 housed (embedded) within first cavity 115 and second magnetically attractable material 116 housed (embedded) within second cavity 117, may provide for a magnetic closing strength between the two terminal ends, such that the two terminal ends may removably couple to each other. In either embodiment, magnets 114 and 116 or first magnet 114 and magnetically attractable material 116, each magnet or magnetically attractable material may be housed (embedded) in a respective cavity (first cavity 115 and second cavity 117). Each cavity may be located within a respective terminal end, i.e. first cavity 115 may be located within first terminal end 102 and second cavity 117 may be located within second terminal end 103. See e.g., FIG. 2C. (Alternatively, in some embodiments, a magnetically attractable material 114 housed within first cavity 115 could be paired with second magnet 116 housed within second cavity 117.)

In order to protect any magnets or magnetically attractable materials (e.g. first magnet 114 and second magnet 116) from environmental harm due to possible contact (communication) with an external environment, the magnets and/or the magnetically attractable materials may be isolated from direct physical contact with the environment by first cavity 115 and second cavity 116 each partially and substantially enclosing and functionally encapsulating each respective magnet or magnetically attractable material within the respective cavity.

As depicted in FIG. 2C, each terminal end may also comprise a back thickness disposed opposite of the un-coupled thickness. For example, and without limiting the scope of the present invention, where first un-coupled thickness 118 may be located between first mating surface 111 and first cavity 115, a first back thickness 120 may be located between first cavity 115 and an external surface disposed opposite of first mating surface 111. See e.g., FIG. 2C. A distance from the external surface disposed opposite of first mating surface 111 and first mating surface 111 may be terminal end thickness 123 (see e.g., FIG. 2A). For example, and without limiting the scope of the present invention, where second un-coupled thickness 119 may be located between second mating surface 112 and second cavity 117, a second back thickness 121 may be located between second cavity 117 and an external surface disposed opposite of second mating surface 112. See e.g., FIG. 2C. A distance from the external surface disposed opposite of second mating surface 112 and second mating surface 112 may be terminal end thickness 123 (see e.g., FIG. 2A).

Further, partial enclosure of each respective magnet or magnetically attractable material within respective cavities (e.g. first cavity 115 and second cavity 117) may maintain magnetic closure strength by utilizing at least one apertures, such as tubular aperture 113, which may run from a given mating surface to the cavity housing a given magnet or magnetically attractable material. See e.g., FIG. 2A and FIG. 2C.

In some embodiments, first terminal end 102 may house first magnet 114 (or first magnetically attractable material 114) in first cavity 115. In some exemplary embodiments, the at least one apertures may comprise three distinct tubular apertures 113 running directly from first mating surface 111 to first cavity 115. Such a geometric arrangement of tubular apertures 113 may be repeated on second terminal end 103 where second magnet 116 (or second magnetically attractable material 116) may be housed within second cavity 117. Tubular apertures 113 may be shown in a triangle distribution in all of the figures, as three tubular apertures 113 openings may be depicted on each mating surface. See e.g., FIG. 2A. However, in other exemplary embodiments different geometric distributions of tubular apertures 113 may operate to the same effect. In some embodiments, there may be one or more tubular apertures 113, wherein a maximum number may be limited by the surface area of the mating surface. In some embodiments, there may be ten or less tubular apertures 113.

In some embodiments, a tubular aperture may not run an entire distance from a mating surface (e.g. 111 or 112) to a respective cavity (e.g. 115 or 117, respectively), where in such embodiments such a tubular aperture may be a tubular dimple 126. See e.g., FIG. 2A. That is, in some embodiments, tubular dimple 126 may run a proximate distance from a given mating surface (e.g. 111 or 112) directly towards the respective cavity (e.g. 115 or 117, respectively) housing the magnet (e.g. 114 or 116, respectively) or the magnetically attractable material (e.g. 114 or 116, respectively). This proximate distance may be less than the entire distance from a mating surface (e.g. 111 or 112) to a respective cavity (e.g. 115 or 117, respectively). This proximate distance may be a depth of a given tubular dimple 126 as measured from a given mating surface (e.g. 111 or 112).

In some embodiments, there may be both at least one tubular aperture 113 and at least one tubular dimple 126 in at least one terminal end (e.g. 102 or 103). In some exemplary embodiments, where may be one tubular aperture 113 and three tubular dimples 126 on each terminal end (e.g. 102 and 103) mating surface (e.g. 111 and 112, respectively). In some embodiments, tubular dimple 126 may serve a same function as tubular aperture 113. In the drawings, any reference to tubular aperture 113 may be replaced with tubular dimple 126 without deviating from the scope of the present invention. Likewise, in the drawings, any reference to tubular dimple 126 may be replaced with tubular aperture 113 without deviating from the scope of the present invention. For example, in FIG. 2A through FIG. 2C tubular dimple 126 may be depicted, but in FIG. 2D and FIG. 2E tubular aperture 113 may be depicted; however, a function of tubular aperture 113 and/or tubular dimple 126 may a same function in all of these five figures.

When first mating surface 111 may be brought together with second mating surface 112, a presence of at least one tubular aperture 113 and/or at least one tubular dimple 126 may operate in at least two ways to preserve the magnetic closure strength of the resulting removable coupling. First, at least one tubular aperture 113 and/or at least one tubular dimple 126 may provide region(s) where the resulting void space within respective cavities of each at least one tubular aperture 113 and/or at least one tubular dimple 126 which may be only filled with air. Air as a gas may hinder magnetic field lines less than a solid material would, thus use of tubular apertures 113 tends to facilitate magnetic strength.

Second, at least one tubular aperture 113 and/or at least one tubular dimple 126 may enhance the means for removably coupling the two mating surfaces 111 and 112 together by including less solid material to compress when the two mating surfaces 111 and 112 may brought together. Having less solid material may be as compared to if there were no at least one tubular aperture 113 and no at least one tubular dimple 126. Having less solid material, because of the presence of void space (cavity space) of at least one tubular aperture 113 and/or at least one tubular dimple 126, may allow for greater compression of the materials between the two mating surfaces 111 and 112. That is, having less solid material between the two mating surfaces, may mean less density for a compression force to operate on, wherein a magnetic field may be applying the compression force. Because of this lowered density between the two mating surfaces 111 and 112 there may be reduction in a separation distance between respective cavities 115 and 117, which in turn may allow for a stronger magnetic field in the means for removably coupling the two mating surfaces together, as magnetic field strength diminishes by the square of the inverse of the separation distance. For example and without limiting the scope of the present invention, even a half millimeter reduction in separation distance, because of enhanced compressibility for example, may provide for a substantially stronger magnetic field as compared to a magnetic field strength with a half millimeter greater separation distance.

As noted above, in some embodiments, at least one tubular aperture 113 and/or at least one tubular dimple 126 may allow the magnetic coupling to compress the material (e.g. first un-coupled thickness 118 and second un-coupled thickness 119 in FIG. 2C) in between first magnet 114 and second magnet 115, reducing the distance (a separation distance) between the magnets and allowing for an even stronger magnetic coupling. Such a compression feature may be depicted in the transition from FIG. 2D and FIG. 2E.

FIG. 2D and FIG. 2E may be intended to be view in sequence (in order from FIG. 2D to FIG. 2E) to visualize the magnetic coupling and material compression in sequence. (Or viewed in reverse from FIG. 2E to FIG. 2D to visualize de-coupling and un-compression.) Notice, in FIG. 2D before the two terminal ends 102 and 103 may be magnetically removably coupled, that first un-coupled thickness 118 may be larger than first coupled thickness 118a in FIG. 2E where the magnetic removable coupling may have occurred and the material of construction may be under compression from the magnetic force.

Note, tubular aperture 113 may be then be styled as at least one magnetic field promoting tubular aperture 113 and/or as at least one magnetic closure promoting tubular aperture 113. Note, tubular dimple 126 may be styled as at least one magnetic field promoting tubular dimple 126 and/or at least one magnetic closure promoting tubular dimple 126.

Also note, such material compression, may require that each terminal end (or at least each mating surface) be substantially constructed from a compressible material of construction. Some exemplary embodiments of the two terminal ends and flexible non-magnetic band 101 may be constructed of an elastomer, such as silicone or a rubber.

In various exemplary embodiments, at least one tubular aperture 113 may have a two dimensional shaped opening wherein the two dimensional shaped opening may be continuously propagated through an entire length of each tubular aperture 113. In some embodiments, at least one tubular dimple 126 may have a two dimensional shaped opening where the two dimensional shaped opening is continuously propagated through an entire length of the proximate distance.

In some embodiments, the two dimensional shaped opening may be selected from a group consisting of a polygon (regular and/or irregular), a circle, an ellipse, an amorphous arcuate shape, and the like. In some embodiments, tubular apertures 113 and/or tubular dimples 126 may have different shapes but still function as the tubular aperture described above.

As noted above, FIG. 3 may depict the exemplary embodiment of elongate article holder 100 as first terminal end 102 and second terminal end 103 may be being brought in proximity of each other, such that formed receiving cavity 122 may be in the process of being formed, shown from a cross-sectional side view. Elongate article 900 upon which elongate article holder 100 operates may not be depicted in FIG. 3. Note, because of how each terminal end may be connected to flexible non-magnetic band 101, formed receiving cavity 122 may not create a perfectly formed circular aperture, but rather may be more hemispherical in shape. See e.g., FIG. 3. The shape of formed receiving cavity 122 may play a role in how formed receiving cavity 122 may hold elongate article 900 or a coil of elongate article 900 when the two terminal ends may be removably coupled. One primary purpose of FIG. 3 may be for comparing the shape of formed receiving cavity 122 against a shape of formed receiving cavity 422 shown in an exemplary embodiment depicted in FIG. 4B and discussed below.

Figure 4A:
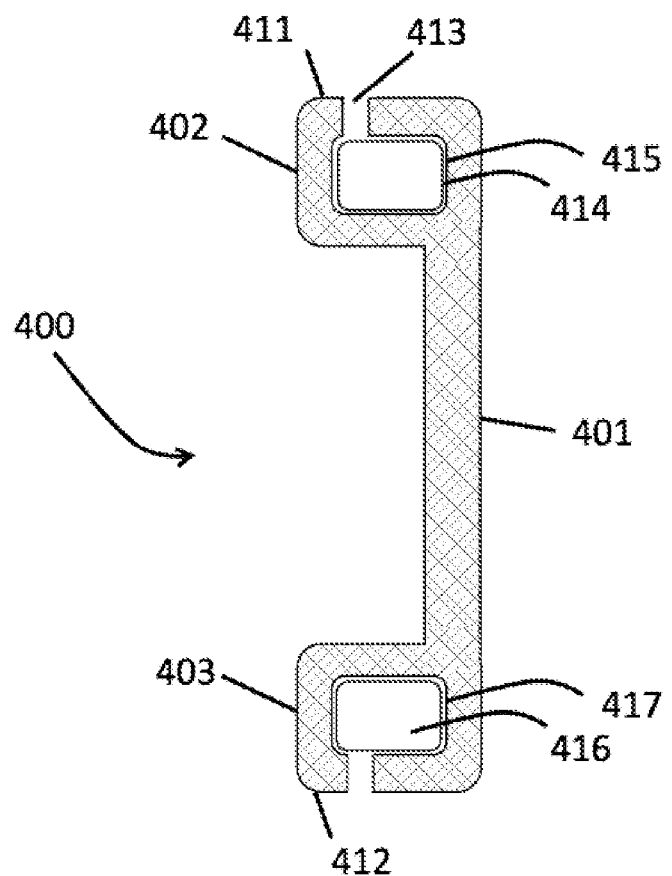
FIG. 4A may depict an exemplary embodiment of an elongate article holder, shown from a longitudinal cross-sectional side view. The embodiment of FIG. 4A may have a different terminal end orientation that the embodiment of FIG. 1A or FIG. 2A. An elongate article upon which the elongate article holder operates is not depicted.

FIG. 4A may depict an exemplary embodiment of elongate article holder 400, shown from a longitudinal cross-sectional side view. Elongate article 900 upon which elongate article holder 400 operates may not be depicted in FIG. 4A.

Figure 4B:
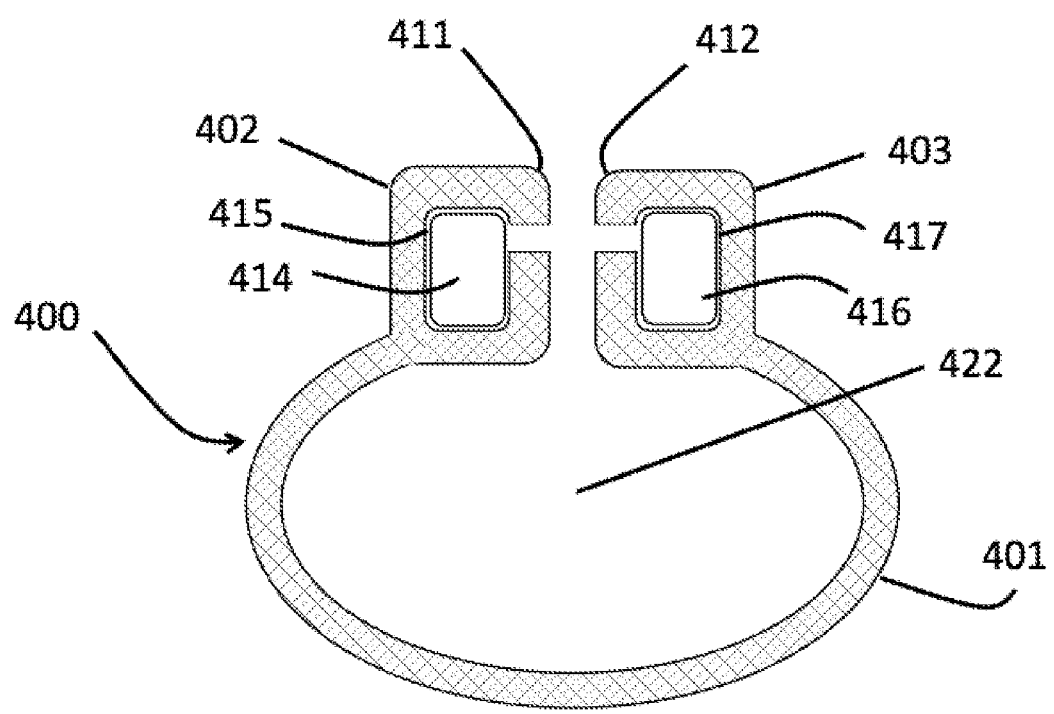
FIG. 4B may depict the exemplary embodiment of the elongate article holder of FIG. 4A as a first terminal end and a second terminal end may be being brought in proximity of each other, such that a formed receiving cavity may be created, shown from a longitudinal cross-sectional side view. An elongate article upon which the elongate article holder operates is not depicted.

FIG. 4B may depict the exemplary embodiment of elongate article holder 400 as first terminal end 402 and second terminal end 403 may be being brought in proximity of each other, such that formed receiving cavity 422 may be in the process of being formed, shown from a cross-sectional side view. Elongate article 900 upon which elongate article holder 400 operates may not be depicted in FIG. 4B.

The FIG. 4 series of figures may differs from the FIG. 1 through FIG. 3 series of figures, in how the flexible non-magnetic band may connects to the respective terminal ends, which may then result in a hemispherical shaped formed receiving cavity 122 in FIG. 3 and a more circular or ovoid shaped formed receiving cavity 422 in FIG. 4B when the two terminal ends may be removably coupled. These two different shaped formed receiving cavities 122 and 422, respectively, may then each hold at least one elongate article 900 or a coil of elongate article 900 differently, depending upon the characteristics of elongate article 900 or the coil of elongate article 900.

In the FIG. 1 through FIG. 3 series of figures flexible non-magnetic band 101 may connects to the two terminal ends in a manner which may result in axial lines (longitudes) of tubular apertures 113 being substantially perpendicular to a longitude of flexible non-magnetic band 101, when flexible non-magnetic band 101 may not be flexed (i.e. when flexible non-magnetic band 101 may be substantially flat and/or straight).

Whereas, in the FIG. 4 series of figures, flexible non-magnetic band 401 may connect to the two terminal ends in a manner which may result in axial lines (longitudes) of tubular apertures 413 being substantially parallel to a longitude of flexible non-magnetic band 401, when flexible non-magnetic band 401 may not be flexed (i.e. when flexible non-magnetic band 401 may be substantially flat and/or straight).

In some embodiments, portable elongate article holder (elongate article holder) 100 or 400 may be described as an article holder (100 or 400 for example), wherein the article holder comprises a first article holding means and a second article holding means.

In some embodiments, the first article holding means may comprise elastic compressible flexible elongate member (e.g. 101 or 401) disposed between two terminal ends (e.g. 102 and 103; or 402 and 403). The two terminal ends may removably couple to each other at a respective mating surface (e.g. 111 and 112; or 411 and 412) of each terminal end forming a formed receiving cavity (e.g. 122 or 422). The formed receiving cavity (e.g. 122 or 422) may wrap around a portion of article 900. Such wrapping may removably hold article 900 to the article holder.

In some embodiments, the second article holding means may be formed from the elastic compressible flexible elongate member (e.g. 101 or 401), disposed between the two terminal ends, by placing two substantially parallel slots (e.g. 109 and 110) in the elastic compressible flexible elongate member. Each such slot may comprise a depth equal to a band thickness (e.g. 124). The band thickness may be a thickness of the elastic compressible flexible elongate member. Each slot may run in a direction substantially parallel with a longitudinal length of the elastic compressible flexible elongate member. A structure may be formed between the two substantially parallel slots, which may be denoted as an integral closed loop (e.g. 104). Such an integral closed loop structure may function for removably attaching the article holder to article 900 by a different portion of article 900 removably passing through an orifice (e.g. 125) formed between the integral closed loop and a portion of the elastic compressible flexible elongate member. See e.g., FIG. 1A.

In some embodiments, each such terminal end (e.g. 102 and 103; or 402 and 403) may comprise: at least one magnetic closure promoting tubular aperture (e.g. 113 or 413) or at least one magnetic closure promoting tubular dimple (e.g. 126); and an un-coupled thickness (e.g. 118). The at least one magnetic closure promoting tubular aperture (e.g. 113 or 413) or the at least one magnetic closure promoting tubular dimple (e.g. 126) may run from the mating surface (e.g. 111 and 112; or 411 and 412) directly towards at least one cavity (e.g. 115 and 117; 415 and 417). See e.g., FIG. 2C or FIG. 3 for at least one magnetic closure promoting tubular dimple 126; and see e.g., FIG. 2D for at least one magnetic closure promoting tubular aperture 113 or FIG. 4A for at least one magnetic closure promoting tubular aperture 413. Each respective at least one cavity (e.g. 115 and 117; 415 and 417) may be located within each respective terminal end (e.g. 102 and 103; or 402 and 403). See e.g., FIG. 2C and FIG. 4A. Each such at least one cavity (e.g. 115 and 117; 415 and 417) may house at least one magnet (e.g. 114 or 116; 414 or 416) or at least one magnetically attractable material (e.g. 114 or 116; 414 or 416). At least one of the two such cavities may comprise the at least one magnet (e.g. 114 or 116; 414 or 416). That is, in some exemplary embodiments, there must be at least one magnet located within at least one cavity within one terminal end; whereas the remaining cavity in the remaining terminal end may house a second magnet or a magnetically attractable material.

The un-coupled thickness (e.g. 118) may run directly from each mating surface (e.g. 111 and 112; or 411 and 412) to each at least one cavity (e.g. 115 and 117; 415 and 417). Removably coupling of each terminal end (e.g. 102 and 103; or 402 and 403) to the other at each mating surface may compress each un-coupled thickness (e.g. 118) into a magnetically compressed coupled thickness (e.g. 118a) which may be less than the un-coupled thickness (e.g. 118). See e.g. FIG. 2D and FIG. 2E. Because of the presence of the at least one magnetic closure promoting tubular aperture (e.g. 113 or 413) or the at least one magnetic closure promoting tubular dimple (e.g. 126) within each un-coupled thickness (e.g. 118), less solid material may be present in each un-coupled thickness (e.g. 118) to compress when the two mating surfaces may be brought together. This may allow for greater compression (because less solid material offers less resistance to compression forces); which in turn may reduce a separation distance between the two at least one cavities (e.g. 115 and 117; 415 and 417); which in turn may allow for a stronger magnetic field in removably coupling each terminal end (e.g. 102 and 103; or 402 and 403) to the other at each mating surface (e.g. 111 and 112; or 411 and 412).

Note, embodiments of elongate article holder 100 and 400 that may comprise at least one magnet, may also function to permit removable attachment of elongate article holder 100 or 400 to various external structures (generally metallic) that may receive a magnetic coupling with the at least one magnet. For example and without limiting the scope of the present invention, such external structures may be refrigerator exterior housings, including refrigerator and freezer doors. Thus, one might use elongate article holder 100 and 400 to keep one or more USB cords or charging cords handy by storing elongate article holder 100 and 400 along with the USB cords or charging cords removably attached to the refrigerator door.

For example and without limiting the scope of the present invention, such external structures may be gurneys and/or metallic frame beds often used in various medical settings, wherein there may be a plurality of corded medical devices needing cording organization. In the medical setting a need to organize cords and such may also be a patient and medical practitioner safety need.

Note, formed receiving cavities 122 and/or 422 may also be used to removably circumscribe and thus hold articles other than elongate articles 900. For example and without limiting the scope of the present invention, formed receiving cavities 122 and/or 422 may be used to circumscribe various portions of clothing articles, such as belts, belt loops and the fabric disposed between a sleeve opening and collar opening. For example and without limiting the scope of the present invention, formed receiving cavities 122 and/or 422 may be used to circumscribe the fabric disposed between the sleeve opening and the collar opening for a jogger, so that the jogger might utilize elongate article holder 100 and 400 to keep headphone (earphone) cordage organized while out jogging (by passing a portion of the cordage through orifice 125 for example). Alternatively, formed receiving cavities 122 and/or 422 might be used to removably circumscribe an appendage of the jogger, e.g. a wrist, an arm, or upper arm.

An elongate article holder, with integral closed loop, and which may be portable in some embodiments, has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A portable elongate article holder configured to organize an elongate article comprising:
   a flexible non-magnetic band, further comprising:
      an integral closed loop for attaching the portable elongate article holder to the elongate article by a portion of the elongate article passing through an orifice formed between the integral closed loop and a portion of the flexible non-magnetic band;
   two terminal ends disposed opposite of each other with the flexible non-magnetic band disposed between the two terminal ends, with each terminal end comprising a mating surface;
   a means for removably coupling two mating surfaces together such that when the two mating surfaces are contacting and substantially parallel to each other, the flexible non-magnetic band forms a formed receiving cavity; wherein the formed receiving cavity circumscribes at least one different portion of the elongate article or a portion of a different elongate article;
   wherein the means for removably coupling two mating surfaces together comprises at least one magnet embedded within one of the two terminal ends and a magnetically attractable material embedded within a remaining terminal end of the two terminal ends;
   wherein each terminal end further comprises:
      at least one magnetic closure promoting tubular aperture running from the mating surface directly to a housing cavity that houses the at least one magnet or the magnetically attractable material; wherein the housing cavity is located within the terminal end;

wherein a presence of the at least one magnetic closure promoting tubular aperture enhances the means for removably coupling two mating surfaces together by including less solid material to compress when the two mating surfaces are brought together, which allows for greater compression, which in turn reduces a separation distance between respective cavities, which in turns allows for a stronger magnetic field in the means for removably coupling two mating surfaces together; and wherein the flexible non-magnetic band, including the integral closed loop, and the two terminals ends are all integral with respect each other.

2. The portable elongate article holder according to claim 1, wherein the integral closed loop is formed from the flexible non-magnetic band by placing two substantially parallel slots in the flexible non-magnetic band, wherein each slot has a depth equal to a band thickness and wherein each slot runs in a direction substantially parallel with a longitudinal length of the flexible non-magnetic band.

3. The portable elongate article holder according to claim 2, wherein the integral closed loop comprises:
 a second longitudinal length which is equal to or less than a first longitudinal length; wherein the first longitudinal length is a major length of the flexible non-magnetic band; and
 a second transverse width which is less than a first transverse width; wherein the first transverse width is a major width of the flexible non-magnetic band; wherein the first longitudinal length is substantially perpendicular with the first transverse width; and the second longitudinal length is substantially perpendicular with the second transverse width;
 wherein the integral closed loop is positioned in the flexible non-magnetic band between the two substantially parallel slots of a first longitudinal slot and a second longitudinal slot, such that the first longitudinal slot, the second longitudinal slot, the first longitudinal length, and the second longitudinal length are all substantially parallel to each other.

4. The portable elongate article holder according to claim 1, wherein the orifice frictionally holds the portion of the elongate article removably passing through the orifice, such that the elongate article and the portable elongate article holder remain in a fixed position with respect to each other.

5. The portable elongate article holder according to claim 1, wherein the magnetically attractable material is at least another magnet.

6. The portable elongate article holder according to claim 1, wherein the at least one magnetic closure promoting tubular aperture has a two dimensional shaped opening where the two dimensional shaped opening is continuously propagated through an entire length of each tubular aperture.

7. The portable elongate article holder according to claim 1, wherein the flexible non-magnetic band, including the integral closed loop, and the two terminal ends are all manufactured as a single article of manufacture.

8. The portable elongate article holder according to claim 1, wherein the flexible non-magnetic band, including the integral closed loop, and the two terminal ends are all substantially manufactured from one or more elastomer materials of construction.

9. The portable elongate article holder according to claim 8, wherein the elastomer is selected from silicone or rubber.

10. The portable elongate article holder according to claim 1, wherein each terminal end further comprises an un-coupled thickness running directly from the mating surface to the housing cavity that exists when the two mating surfaces are not coupled; wherein the un-coupled thickness becomes a coupled thickness that is less thick than the un-coupled thickness when the two mating surfaces are coupled.

11. A portable elongate article holder configured to organize an elongate article comprising:
 a flexible non-magnetic band, further comprising:
  an integral closed loop for attaching the portable elongate article holder to the elongate article by a portion of the elongate article passing through an orifice formed between the integral closed loop and a portion of the flexible non-magnetic band;
 two terminal ends disposed opposite of each other with the flexible non-magnetic band disposed between the two terminal ends, with each terminal end comprising a mating surface;
 a means for removably coupling two mating surfaces together such that when the two mating surfaces are contacting and substantially parallel to each other, the flexible non-magnetic band forms a formed receiving cavity; wherein the formed receiving cavity circumscribes at least one different portion of the elongate article or a portion of a different elongate article;
 wherein the means for removably coupling two mating surfaces together comprises at least one magnet embedded within one of the two terminal ends and a magnetically attractable material embedded within a remaining terminal end of the two terminal ends;
 wherein each terminal end further comprises:
  at least one magnetic closure promoting tubular dimple running a proximate distance from the mating surface directly towards a housing cavity housing the at least one magnet or the magnetically attractable material; wherein the housing cavity is located within the terminal end;
 wherein a presence of the at least one magnetic closure promoting tubular dimple enhances the means for removably coupling two mating surfaces together by including less solid material to compress when the two mating surfaces are brought together, which allows for greater compression, which in turn reduces a separation distance between respective cavities, which in turns allows for a stronger magnetic field in the means for removably coupling two mating surfaces together; and
 wherein the flexible non-magnetic band, including the integral closed loop, and the two terminals ends are all integral with respect each other.

12. The portable elongate article holder according to claim 11, wherein the integral closed loop is formed from the flexible non-magnetic band by placing two substantially parallel slots in the flexible non-magnetic band, wherein each slot has a depth equal to a band thickness and wherein each slot runs in a direction substantially parallel with a longitudinal length of the flexible non-magnetic band.

13. The portable elongate article holder according to claim 12, wherein the integral closed loop comprises:
 a second longitudinal length which is equal to or less than a first longitudinal length; wherein the first longitudinal length is a major length of the flexible non-magnetic band; and
 a second transverse width which is less than a first transverse width; wherein the first transverse width is a major width of the flexible non-magnetic band; wherein the first longitudinal length is substantially perpendicular with the first transverse width; and the second longitudinal length is substantially perpendicular with the second transverse width;

wherein the integral closed loop is positioned in the flexible non-magnetic band between the two substantially parallel slots of a first longitudinal slot and a second longitudinal slot, such that the first longitudinal slot, the second longitudinal slot, the first longitudinal length, and the second longitudinal length are all substantially parallel to each other.

14. The portable elongate article holder according to claim 11, wherein the orifice frictionally holds the portion of the elongate article removably passing through the orifice, such that the elongate article and the portable elongate article holder remain in a fixed position with respect to each other.

15. The portable elongate article holder according to claim 11, wherein the magnetically attractable material is at least another magnet.

16. The portable elongate article holder according to claim 11, wherein the at least one magnetic closure promoting tubular dimple has a two dimensional shaped opening.

17. The portable elongate article holder according to claim 11, wherein the flexible non-magnetic band, including the integral closed loop, and the two terminal ends are all manufactured as a single article of manufacture.

18. The portable elongate article holder according to claim 11, wherein the flexible non-magnetic band, including the integral closed loop, and the two terminal ends are all substantially manufactured from one or more elastomer materials of construction.

19. The portable elongate article holder according to claim 18, wherein the elastomer is selected from silicone or rubber.

20. The portable elongate article holder according to claim 11, wherein each terminal end further comprises an un-coupled thickness running directly from the mating surface to the housing cavity that exists when the two mating surfaces are not coupled; wherein the un-coupled thickness becomes a coupled thickness that is less thick than the un-coupled thickness when the two mating surfaces are coupled.

* * * * *